(12) United States Patent
Youn (10) Patent No.: US 12,263,377 B2
(45) Date of Patent: Apr. 1, 2025

(54) GOLF ANALYSIS DEVICE WITH CALIBRATION FUNCTION

(71) Applicant: Swing Logic Ventures, Inc., Edmond, OK (US)

(72) Inventor: Jong Sang Youn, Seongnam-si (KR)

(73) Assignee: Swing Logic Ventures, Inc., Edmond, OK (US)

( * ) Notice: Subject to any disclaimer, the term of this patent is extended or adjusted under 35 U.S.C. 154(b) by 115 days.

(21) Appl. No.: 17/701,805

(22) Filed: Mar. 23, 2022

(65) Prior Publication Data

US 2022/0339495 A1 Oct. 27, 2022

(30) Foreign Application Priority Data

Apr. 26, 2021 (KR) ........................ 10-2021-0053462

(51) Int. Cl.
| | |
|---|---|
| *A63B 24/00* | (2006.01) |
| *A63B 69/36* | (2006.01) |
| *A63B 71/06* | (2006.01) |
| *G06V 40/20* | (2022.01) |

(52) U.S. Cl.
CPC ...... *A63B 24/0006* (2013.01); *A63B 69/3623* (2013.01); *A63B 71/0622* (2013.01); *G06V 40/23* (2022.01); *A63B 2071/063* (2013.01); *A63B 2220/807* (2013.01); *A63B 2220/89* (2013.01); *A63B 2225/02* (2013.01)

(58) Field of Classification Search
CPC ............ A63B 24/0006; A63B 69/3623; A63B 71/0622; A63B 2071/063; A63B 2220/807; A63B 2220/89; A63B 2225/02; A63B 60/46; G06V 40/23
See application file for complete search history.

(56) References Cited

U.S. PATENT DOCUMENTS

| | | | |
|---|---|---|---|
| 2008/0182685 A1* | 7/2008 | Marty | A63B 69/38 |
| | | | 473/407 |
| 2015/0335978 A1* | 11/2015 | Syed | A63B 24/0006 |
| | | | 473/223 |
| 2019/0262690 A1* | 8/2019 | Kim | A63B 69/3685 |
| 2020/0364462 A1* | 11/2020 | Imes | A63B 24/0062 |
| 2021/0069548 A1* | 3/2021 | Beach | A63B 60/46 |

FOREIGN PATENT DOCUMENTS

| | | | | |
|---|---|---|---|---|
| KR | 20100034583 A | * | 4/2010 | ............. G01S 15/42 |
| KR | 20180085843 A | * | 7/2012 | ......... A63B 24/0006 |
| KR | 101704727 B1 | * | 9/2019 | ............. A63B 60/46 |

* cited by examiner

*Primary Examiner* — Sundhara M Ganesan
*Assistant Examiner* — Jacqueline N L Loberiza
(74) *Attorney, Agent, or Firm* — Bridgeway IP Law Group, PLLC; Jihun Kim (57) ABSTRACT

Proposed is a golf analysis device with a calibration function, which includes a sensor unit configured to generate tracking data for at least one of a golf club moving by a user's swing motion and a golf ball hit by the user's swing motion; an analysis unit configured to generate a swing analysis value of the user by analyzing the tracking data; and a communication unit configured to transmit the swing analysis value to a user terminal, and receive calibration information on the swing analysis value from the user terminal. As a swing analysis value can be generated based on the calibration information received from the user terminal, the golf analysis device allows the user to receive very accurate swing analysis results.

6 Claims, 7 Drawing Sheets

GOLF ANALYSIS DEVICE WITH CALIBRATION FUNCTION

CROSS REFERENCE TO RELATED APPLICATIONS

This application claims the priority benefit of Korean Patent Application No. 10-2021-0053462 filed on Apr. 26, 2021, the entirety of which is incorporated by reference herein.

BACKGROUND OF THE INVENTION

1. Field of the Invention

The present invention relates to a golf analysis device with a calibration function, and more particularly, to a device for analyzing a swing of a golf club, in which, as a swing analysis value can be generated based on calibration information received from a user terminal, a user may receive very accurate swing analysis results, as well as a swing analysis value with very high accuracy can be generated even when the user performs only a golf swing motion without hitting a golf ball.

2. Description of the Related Art

Various golf analysis devices using a radar sensor are used to analyze a flying distance, flight, trajectory, etc. of a golf ball hit by a golfer in a driving range, a field, a virtual driving range and the like.

Such a conventional golf analysis device known in the art is operated in a manner of outputting an analysis value such as a flying distance generated by analyzing tracking data for a golf ball hit by a golfer's swing through a self-equipped monitor.

However, due to limitations in the accuracy of the radar sensor equipped in the conventional golf analysis device, a difference between a swing analysis value and an actual swing result value inevitably occurs in the art. However, the conventional golf analysis device has a technical limitation that such a difference cannot be corrected.

SUMMARY OF THE INVENTION

Accordingly, it is an object of the present invention to provide a golf analysis device, in which, as a swing analysis value can be generated based on calibration information received from a user terminal, a user may receive very accurate swing analysis results, as well as a swing analysis value with very high accuracy can be generated even when the user performs only a golf swing motion without hitting a golf ball.

To achieve the above object, according to an aspect of the present invention, there is provided a golf analysis device with a calibration function including: a sensor unit configured to generate tracking data for at least one of a golf club moving by a user's swing motion and a golf ball hit by the user's swing motion; an analysis unit configured to generate a swing analysis value of the user by analyzing the tracking data; and a communication unit configured to transmit the swing analysis value to a user terminal, and receive calibration information on the swing analysis value from the user terminal.

Preferably, the analysis unit generates the swing analysis value based on the tracking data for the golf club generated by the sensor unit and the calibration information.

In addition, the golf analysis device may further include a speaker module configured to output the swing analysis value by voice.

Further, the analysis unit may compute a distance from the golf analysis device to a hole cup based on location information of the golf analysis device.

In addition, the golf analysis device may further include a remote control module detachably coupled to the golf analysis device and configured to transmit a request for providing distance information to the hole cup to the golf analysis device through the communication unit according to information input using a button of the remote control module by the user.

In addition, the golf analysis device may further include a fixation part configured to fix the golf analysis device to a golf cart.

In addition, the golf analysis device may further include a holder on which the user terminal is placed.

Further, the sensor unit may detect the user who climbs up on a tee box.

According to the present invention, as a swing analysis value can be generated based on the calibration information received from the user terminal, the golf analysis device allows the user to receive very accurate swing analysis results.

In addition, according to the present invention, the golf analysis device may generate a swing analysis value with very high accuracy even when the user performs only a golf swing motion without hitting a golf ball.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

Figure 1:
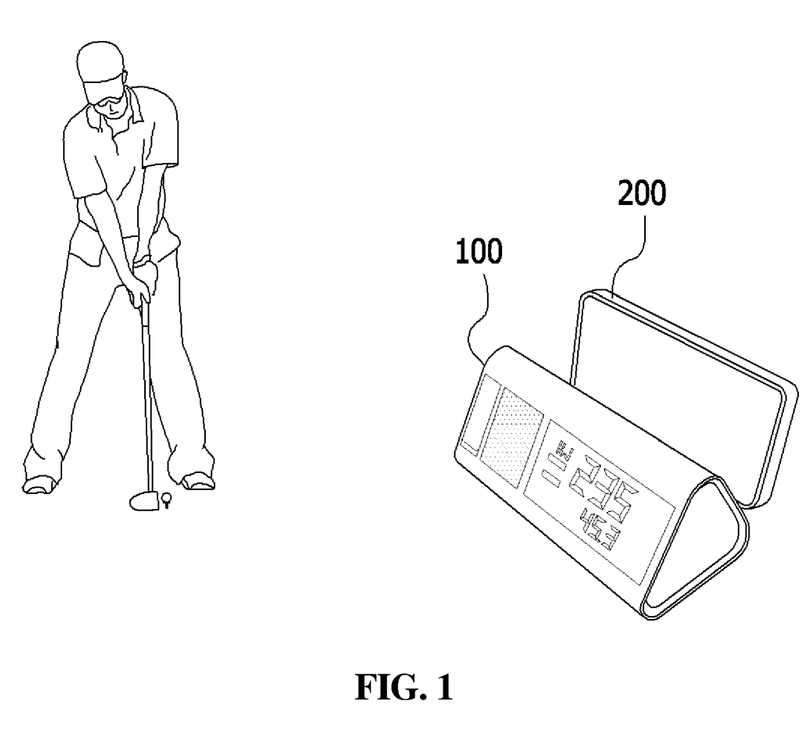
FIG. 1 is a view illustrating a usage environment of a golf analysis device according to an embodiment of the present invention.

FIG. 1 is a view illustrating a usage environment of a golf analysis device according to an embodiment of the present invention. As shown in FIG. 1, a golf analysis device 100 according to an embodiment of the present invention is installed to face a head of a golf club and a golf ball on the ground on which a user who performs a swing motion of the golf club stands.

This golf analysis device 100 generates tracking data for the head of the golf club moving by a user's swing motion, and also generates tracking data for the hit golf ball when the golf ball is hit due to the user's swing motion.

The golf analysis device 100 generates a swing analysis value of the user by analyzing the tracking data generated as described above, and outputs the generated swing analysis value through a self-equipped display unit 130 or a speaker module 150, and transmits it to a user terminal 200 such as a smartphone.

As such, the user terminal 200 receives the swing analysis value from the golf analysis device 100 and outputs it on the screen thereof, which is generated by self-analyzing the tracking data by the golf analysis device 100. To this end, it is preferable that the user terminal 200 includes an application program installed therein, which is necessary for the use of the golf analysis device 100 according to an embodiment of the present invention.

As described above, in the present invention, the swing analysis value received from the golf analysis device 100 can be output by the application program installed in the user terminal 200 without performing a process of directly analyzing the tracking data, thereby greatly improving a reaction speed of the application program.

In addition, in carrying out the present invention, the golf analysis device 100 may be provided with a holder on which the user terminal 200 is placed. Thereby, as shown in FIG. 1, in a state in which the user terminal 200 is placed on the golf analysis device 100, photographing of the user's swing motion may be simultaneously performed through a camera module provided in the user terminal 200.

Figure 2:
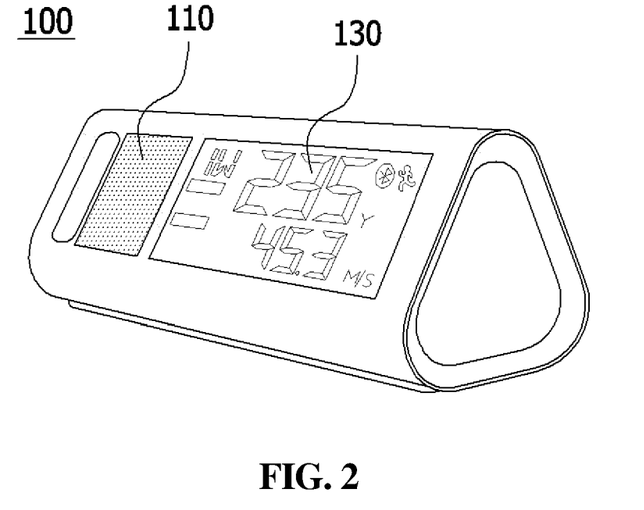
FIG. 2 is a perspective view illustrating a front structure of the golf analysis device according to an embodiment of the present invention.

FIG. 2 is a perspective view illustrating a front structure of the golf analysis device according to an embodiment of the present invention. As shown in FIG. 2, the golf analysis device 100 may be provided with a sensor unit 110 at a front surface thereof, such as a radar sensor for generating tracking data for the head of the golf club moving by the user's swing motion and the golf ball hit by the club head, and a display unit 130 on which the swing analysis value generated by analyzing the tracking data is displayed.

Figure 3:
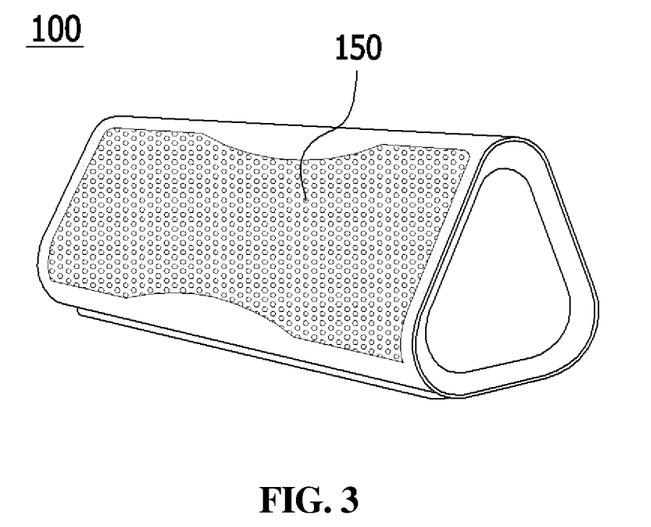
FIG. 3 is a perspective view illustrating a rear structure of the golf analysis device according to an embodiment of the present invention.

FIG. 3 is a perspective view illustrating a rear structure of the golf analysis device according to an embodiment of the present invention. As shown in FIG. 3, the golf analysis device 100 may be additionally provided with the speaker module 150 at a rear surface thereof for outputting the swing analysis value of the user by voice.

Figure 4:
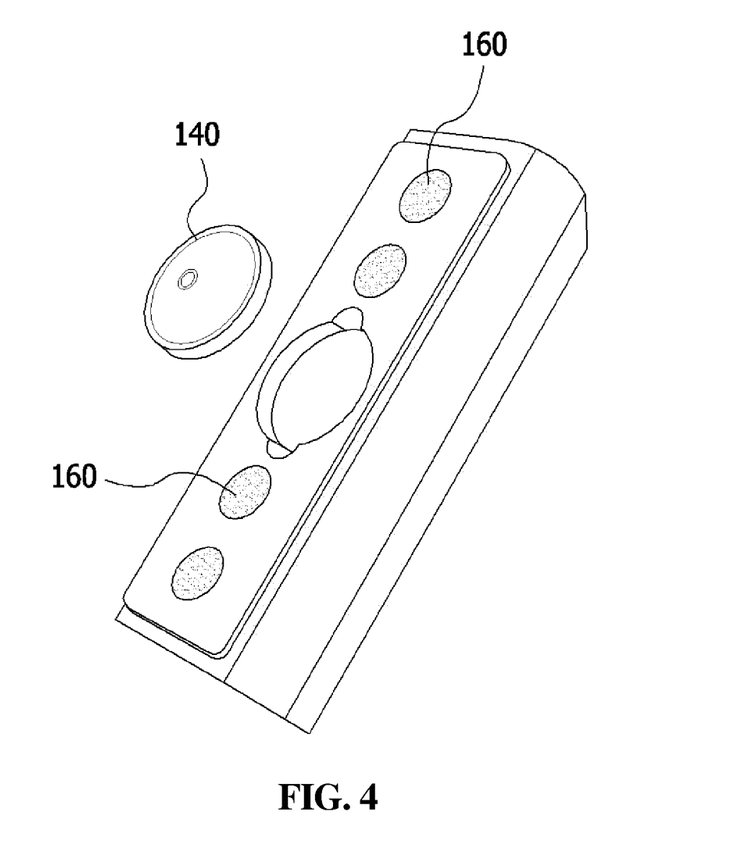
FIG. 4 is a perspective view illustrating a bottom structure of the bottom surface of the golf analysis device according to an embodiment of the present invention.

FIG. 4 is a perspective view illustrating a structure of the bottom surface of the golf analysis device according to an embodiment of the present invention. As shown in FIG. 4, the golf analysis device 100 may be provided with a remote control module 140 detachably installed in a circular groove formed in a bottom surface thereof, and the golf analysis device 100 may be provided with fixation parts 160 on the bottom surface thereof for fixing the golf analysis device 100 to a subject such as an outer frame 10 of a golf cart as shown in FIG. 5.

In carrying out the present invention, the fixation part 160 provided on the bottom surface of the golf analysis device 100 may be a magnetic material that allows the golf analysis device 100 to be fixedly installed to the subject such as the outer frame 10 of the golf cart in a magnetic coupling manner.

Figure 5:
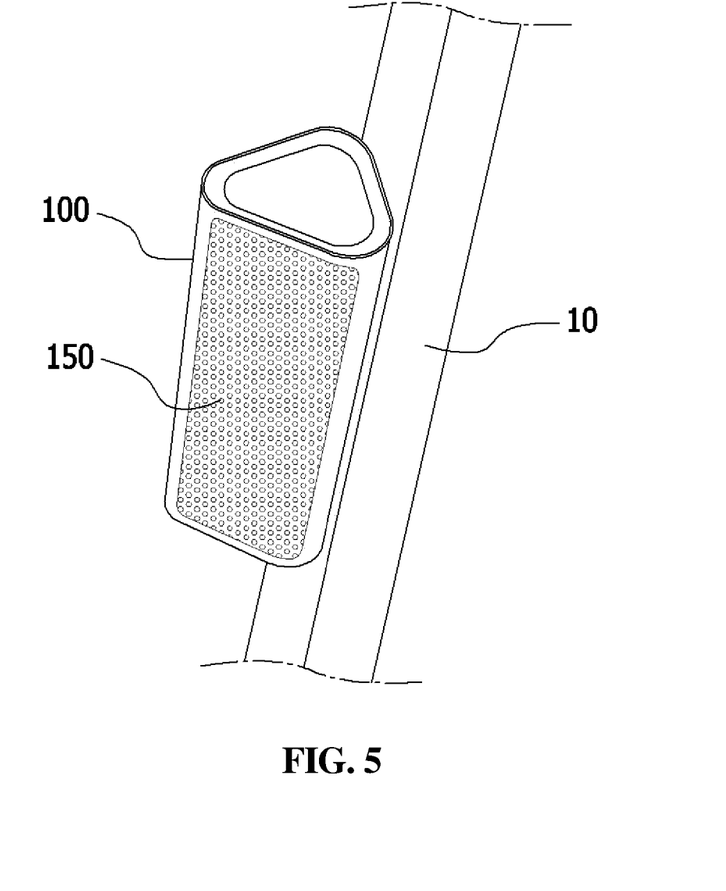
FIG. 5 is a perspective view illustrating an installation state of the golf analysis device to a golf cart according to an embodiment of the present invention.

Meanwhile, when carrying out the present invention, in a state in which the golf analysis device 100 according to the present invention is magnetically coupled to the outer frame 10 of the golf cart as shown in FIG. 5, a user who performs a play on the field may check the remaining distance from the hole to a hole cup by inputting information using a button of the remote control module 140 carried by the user by separating it from the golf analysis device 100.

Specifically, as the information using the button of the remote control module 140 is input by the user, the golf analysis device 100 receives a request for providing distance information from the remote control module 140 to the hole cup. Thereby, the golf analysis device 100 may compute the distance from the golf analysis device 100 to the hole cup based on GPS location information confirmed through a self-equipped GPS module and location information of the hole cup in the golf hole, and output the computed distance information through the speaker module 150, thereby providing information on the remaining distance to the hole cup to the user who is playing a round.

Figure 6:
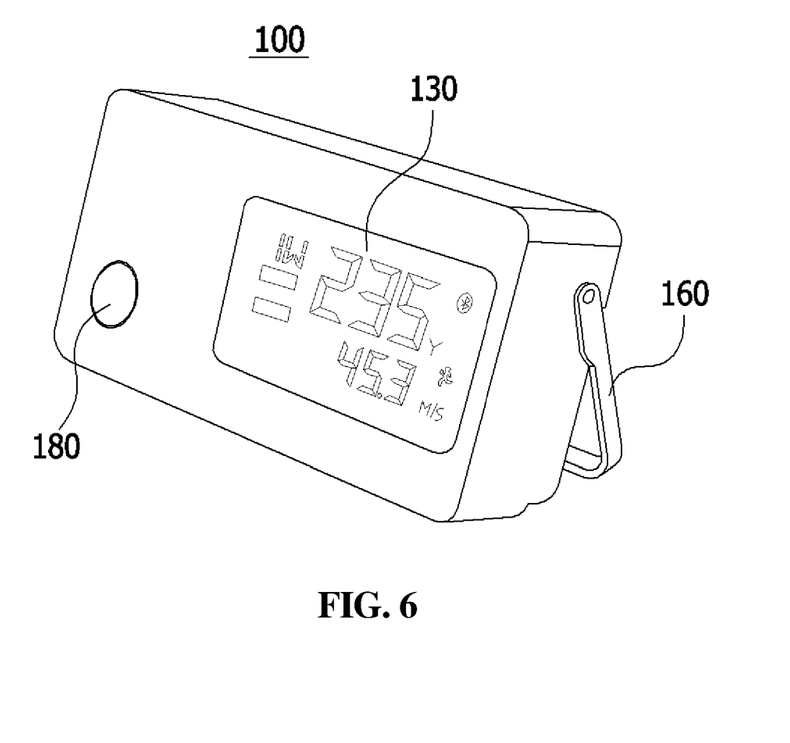
FIG. 6 is a diagram illustrating a golf analysis device according to another embodiment of the present invention.

FIG. 6 is a diagram illustrating a golf analysis device according to another embodiment of the present invention. As shown in FIG. 6, a golf analysis device 100 according to another embodiment of the present invention may be provided with a camera unit 180 at a front surface thereof for photographing the user's swing motion, and a support for supporting the golf analysis device 100 so that the golf analysis device 100 erected on the ground does not collapse as a fixation part 160 for fixing the golf analysis device 100 to the subject.

Figure 7:
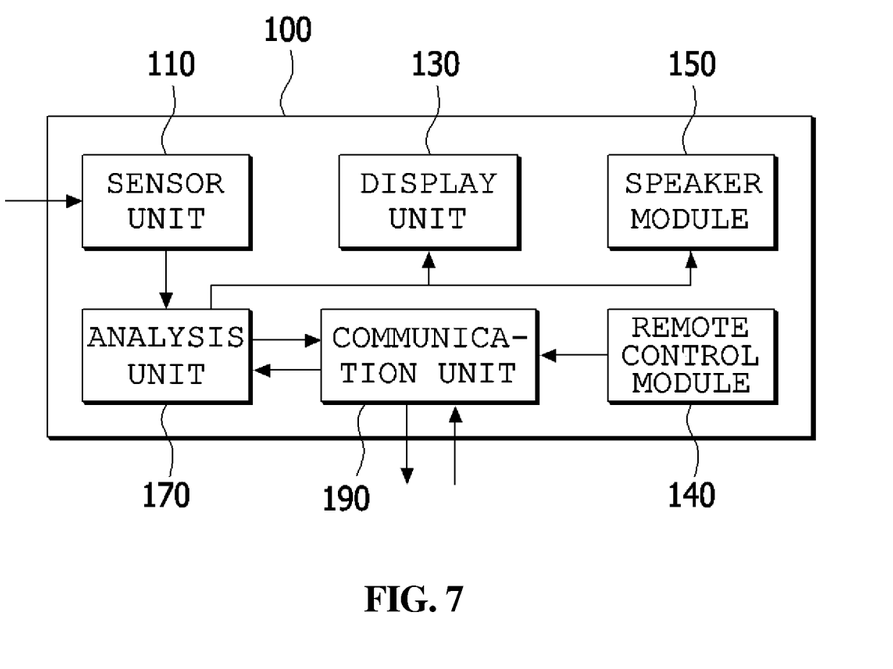
FIG. 7 is a functional block diagram illustrating the structure of a golf analysis device according to an embodiment of the present invention.

FIG. 7 is a functional block diagram illustrating the structure of a golf analysis device according to an embodiment of the present invention. Referring to FIG. 7, the golf analysis device 100 according to an embodiment of the present invention includes the sensor unit 110, the display unit 130, the remote control module 140, the speaker module 150, an analysis unit 170, and a communication unit 190.

The sensor unit 110 of the golf analysis device 100 includes a radar sensor, and generates tracking data for a golf club head moving by the user's swing motion and a golf ball hit by the club head.

Meanwhile, the analysis unit 170 is configured to analyze the tracking data generated by the sensor unit 110, thereby generating a swing analysis value such as a club head speed, a ball speed, a flying distance, a launching angle (launch angle of a ball), a ball flight (e.g., slice, hook, etc.), a movement trajectory of the ball and the like.

In addition, the analysis unit 170 computes the distance from the golf analysis device 100 to the hole cup based on the GPS location information in the GPS module equipped in the golf analysis device 100 itself and the location information of the hole cup in the golf hole on which the user is played.

The communication unit 190 includes a Bluetooth module for supporting local area communication between the golf analysis device 100 and the user terminal 200, and is configured to transmit the swing analysis value generated by the analysis unit 170 to the user terminal 200, and receive calibration information from the user terminal 200.

Meanwhile, the display unit 130 visually outputs the swing analysis value of the analysis unit 170, the speaker module 150 outputs the swing analysis value of the analysis unit 170 by voice, and the remote control module 140 transmits a request for providing distance information to the hole cup to the golf analysis device 10 through the communication unit 190 as information is input using the button by the user.

Figure 8:
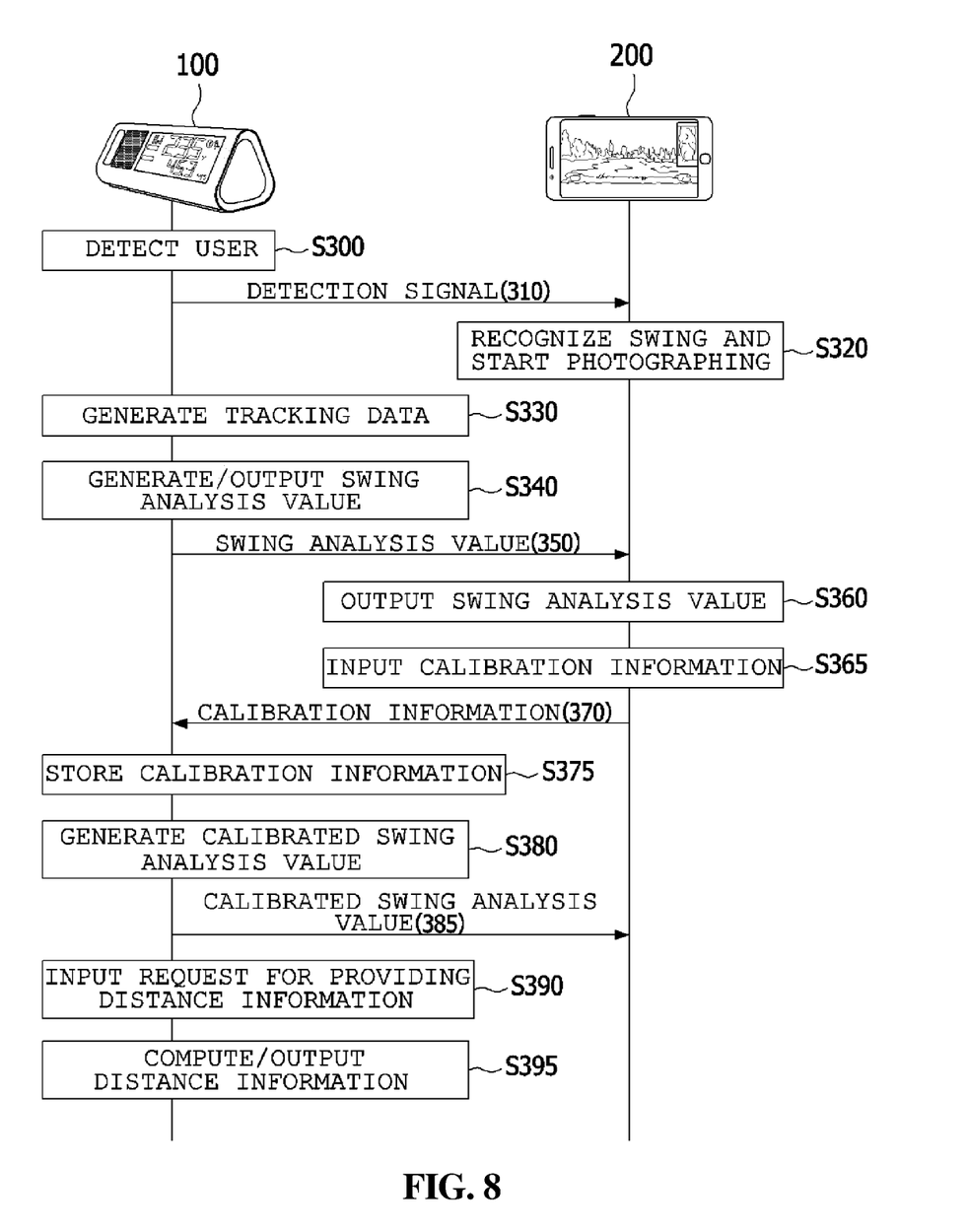
FIG. 8 is a signal flow diagram for describing an operation principle of the golf analysis device according to the present invention.

FIG. 8 is a signal flow diagram for describing an operation principle of the golf analysis device according to the present invention. Hereinafter, the operation principle of the golf analysis device 100 according to an embodiment of the present invention will be described with reference to FIGS. 1 to 8.

First, when the radar sensor provided in the sensor unit 110 of the golf analysis device 100 detects a user as the user climbs up on a tee box to swing (S300), the golf analysis device 100 transmits a user detection signal to the user terminal 200 (S310).

Thereby, as the user terminal 200 receives the user detection signal from the golf analysis device 100, the application program installed in the user terminal 200 may activate the camera module of the user terminal 200, thereby waiting to photograph the user's swing motion.

As described above, in the present invention, the camera module of the user terminal 200 is selectively activated only when the user detection signal is received from the golf analysis device 100 without constantly activating the camera module, thereby power consumption in the user terminal 200 can be minimized.

Thereafter, when there is a user's swing motion, the application program installed in the user terminal 200 determines the user's swing motion by dividing it into a preliminary swing motion (i.e., empty swing) and a main swing motion (i.e., hitting swing), and may transmit a command to start photographing to the camera module only when it is determined that the user's swing motion is the main swing motion (S320).

Hereinafter, a method for determining the user's swing motion by dividing it into the preliminary swing motion and the main swing motion by the application program installed in the user terminal 200 will be described in detail.

When carrying out the present invention, in order for the application program installed in the user terminal 200 to determine the user's swing motion by dividing it into the preliminary swing motion and the main swing motion, the user terminal 200 may be provided with a high-performance microphone module for collecting sounds around the tee box, or alternately it may be configured so that the user terminal 200 may receive sound information in real time from high-performance microphone equipment installed in the tee box.

Meanwhile, generally, golfers perform the main swing motion after performing the preliminary swing motions about two or three times in succession before starting the main swing motion at the tee box. Meanwhile, commonly, when a golfer performs the preliminary swing motion, some noise is generated due to conversations or movements of companions, whereas when the golfer performs the preparation motion of the main swing, the companions stop talking and movement all at once, such that the noise level around the tee box is rapidly lowered.

Thereby, when it is determined that the noise level of the noise around the tee box collected from the microphone module is rapidly lowered to zero (0), the application program of the user terminal 200 determines that the user has performed the preparation motion for the main swing, and may transmit a command to start photographing to the camera module.

In addition, generally, golfers have a habit of having a time interval longer than the time interval between consecutive preliminary swing motions before performing the main swing motion after two or three consecutive preliminary swing motions are performed.

Accordingly, the application program of the user terminal 200 calculates an interval between times at which sounds (i.e., preliminary swing sounds) of the golf club such as 'Boong' breaking through the air are respectively detected according to the continuous preliminary swing motions (i.e., a preliminary swing time interval: for example, 2 seconds), and when the preliminary swing sound is not detected until a time (e.g., 3 seconds) of a predetermined multiple (e.g., 1.5 times) of the calculated preliminary swing time interval from the time at which the last preliminary swing sound is detected elapses, it is determined that the user is in the preparation motion stage of the main swing, and may transmit the command to start photographing to the camera module.

Meanwhile, to this end, it is preferable that sound pattern information on preliminary swing sounds at various swing speeds of various golf clubs is stored in an internal memory of the user terminal 200, so that the application program of the user terminal 200 can compare and analyze the sound information collected by the microphone module.

In addition, some golfers have a habit of generating a small sound (noise during the preparation stage such as coughing and waggling, that is, preparation sound) before performing the main swing motion, but after performing preliminary swing motions 2 or 3 times.

Accordingly, when it is determined that the sound collected by the microphone module, after the sound (i.e., preliminary swing sound) of the golf club such as 'Boong' breaking through the air is detected according to the preliminary swing motion, has the same sound pattern as the predetermined preparatory sound pattern previously stored in the internal memory, the application program of the user terminal 200 may determine that the user is in the preparatory motion stage of the main swing, and transmit a command to start photographing to the camera module.

As described above, as the application program transmits the command to start photographing to the camera module of the user terminal 200, the camera module of the user terminal 200 installed to face the tee box may start photographing for the user's main swing motion (S320).

Meanwhile, in carrying out the present invention, as shown in FIG. 6, when the camera unit 180 is equipped in the golf analysis device 100 itself, and if the user is detected by the sensor unit 110 of the golf analysis device 100 in the above-described step S300, the analysis unit 170 of the golf analysis device 100 may activate the camera unit 180 when receiving the user detection signal from the sensor unit 110, thereby waiting to photograph the user's swing motion. Then, when there is a user's swing motion, the analysis unit 170 determines the user's swing motion by dividing it into the preliminary swing motion (i.e., empty swing) and the main swing motion (i.e., hitting swing) as in the above-described step S320, and then, when it is determined that the user's swing motion is the main swing motion, may transmit a command to start photographing to the camera unit 180.

Meanwhile, as the user performs the swing motion as described above, the sensor unit 110 of the golf analysis device 100 generates tracking data for the golf club head moving by the user's swing motion and the golf ball hit by the club head (S330).

Meanwhile, the analysis unit 170 of the golf analysis device 100 analyzes the tracking data generated by the sensor unit 110, and thereby the swing analysis value such as the club head speed, the ball speed, the flying distance, the launching angle (launch angle of the ball), the ball flight (e.g., slice, hook, etc.), and the movement trajectory of the ball are generated, and the generated swing analysis value is visually output through the display unit 130 or output through the speaker module 150 by voice (S340).

In addition, the communication unit 190 of the golf analysis device 100 may transmit the swing analysis value generated as described above to the user terminal 200 (S350), and then the application program installed in the user terminal 200 may visualize the swing analysis value received from the golf analysis device 100 in the form of various graphic images and output through the screen of the user terminal 200 (S360).

As described above, in the present invention, the swing analysis value directly generated by and received from the golf analysis device 100 can be output by the application program installed in the user terminal 200 without analyzing the tracking data, thereby greatly improving a reaction speed of the application program.

Meanwhile, the user who has confirmed the swing analysis value output through the user terminal 200 as described above may input calibration information on the swing analysis value through the user terminal 200 (S365).

Specifically, when the actual observed flying distance of the ball is different from the swing analysis value of the golf analysis device 100, the user who hits an actual ball in a driving range or a field through the swing motion of the golf club may input the calibration information on the swing analysis value through the user terminal 200.

For example, when the user wants to calibrate the swing analysis value, the application program may activate a calibration information input window as the user selects the corresponding swing analysis value output on the touch screen of the user terminal 200. Thereby, the user may input the actual observed flying distance of the ball to the user terminal 200.

Accordingly, the application program of the user terminal 200 calculates an increase/decrease rate (e.g., +15%, −10%, etc.) of a value input by the user in the above-described step S360 compared to the swing analysis value in the above-described step S350, and the increase/decrease rate value calculated as described above may be transmitted to the golf analysis device 100 as calibration information on the swing analysis value.

Further, in carrying out the present invention, the user may directly input the increase/decrease rate of the swing analysis value for calibration of the swing analysis value as calibration information in the above-described step S360.

In addition, in carrying out the present invention, the user may input the calibration information by modifying the movement trajectory of the ball which is subjected to image processing and displayed on the touch screen of the user terminal 200 in a touch & drag method in the above-described step S360.

For example, the user may adjust the movement trajectory of the ball in the touch & drag method so that a slice degree in the movement trajectory of the ball displayed on the touch screen of the user terminal 200 matches the slice degree of the actually struck ball. In this case, the application program may digitize an adjustment degree of the slice in the movement trajectory of the ball by the user by combining it with a sign (+/−) indicating an adjustment direction, thus to generate the calibration information.

Meanwhile, the calibration information received by the golf analysis device 100 through the communication unit 190 from the user terminal 200 is stored in the internal memory of the golf analysis device 100 (S375), and then the analysis unit 170 may utilize the calibration information stored in the internal memory when generating the swing analysis value of the user.

Meanwhile, in carrying out the present invention, the calibration information as described above may be divided and stored by user of a plurality of users who use the golf analysis device 100 together, and may be utilized as necessary.

To this end, when the application program installed in the user terminal 200 is executed as the golf analysis device 100 is communicatively connected to the user terminal 200 by inputting an operation power of the golf analysis device 100 before the above-described step S300, the application program may activate an input window which allows the user to input user ID selection information (e.g., USER 1, USER 2, etc.).

Accordingly, as the user selects his/her ID, the application program may transmit the user ID selection information to the golf analysis device 100.

In this case, in the above-described step S375, the golf analysis device 100 may store the calibration information received from the user terminal 200 in association with the corresponding user ID.

Meanwhile, when the user selects his/her ID through the application program connected to the golf analysis device 100 by inputting the power of the golf analysis device 100, the golf analysis device 100 receives the user ID information from the application program.

Thereafter, as the user executes the swing motion of the golf club 10, the golf analysis device 100 generates a swing analysis value as in the above-described steps S330 and S340. Then, the analysis unit 170 of the golf analysis device 100 may perform calibration on the swing analysis value based on the calibration information stored in association with the corresponding user ID in the above-described step S375, thus to generate a calibrated swing analysis value, and output it through the display unit 130 or the speaker module 150 (S380).

Specifically, when the calibration information on the flying distance of the ball stored in the above-described step S375 is +15%, the analysis unit 170 of the golf analysis device 100 may generate the calibrated swing analysis value by applying the corresponding increase/decrease rate value (+15%) to the swing analysis value generated as in the above-described step S340.

Meanwhile, the user terminal 200 receives the calibrated swing analysis value as described above from the golf analysis device 100 (S385), and outputs it through the screen of the user terminal 200. As a result, the user may confirm a very accurate swing analysis value for his or her swing motion.

In addition, in carrying out the present invention, even when the user performs only the swing motion of the golf club 10 without a golf ball, it is possible to generate a swing analysis value based on the stored calibration information in association with the user ID in the above-described step S375.

To this end, in the above-described step S340, the golf analysis device 100 may store the swing analysis value generated based on the tracking data for the golf club head and the golf ball in association with the tracking data for the golf club.

Thereafter, when the user performs only the swing motion of the golf club without the golf ball, the analysis unit 170 of the golf analysis device 100 searches for tracking data of the golf club head having the same data pattern as the tracking data generated for the golf club head through the internal memory, and may alternatively generate the swing analysis value stored in association with the searched tracking data as the swing analysis value when the user performs only the swing motion of the golf club without the golf ball.

In addition, the analysis unit 170 of the golf analysis device 100 may perform calibration on the alternatively generated swing analysis value as described above based on the calibration information stored in association with the user ID in the above-described step S375, thus to generate a calibrated swing analysis value (S380).

As described above, according to the present invention, tracking data generated by hitting the golf ball with the golf club, a swing analysis value generated by analyzing the corresponding tracking data, and calibration information on the corresponding swing analysis value are stored in the golf analysis device 100 together with the user ID, then the user may receive the very accurate swing analysis value for his or her swing motion even when performing only the swing motion of the golf club without hitting the golf ball.

Meanwhile, as the golf analysis device 100 transmits the swing analysis value generated as described above to the user terminal 200 or simulation equipment supporting golf practice and games, the user terminal 200 or the simulation equipment may utilize the alternatively generated swing analysis value as described above based on the user's swing motion without hitting the golf ball, thereby simulating the user's golf swing with very high precision, or practicing golf and/or playing a game.

In addition, in carrying out the present invention, when the user plays a round of golf, in a state in which the golf analysis device 100 is magnetically coupled to the outer frame 10 of the golf cart as shown in FIG. 5, it is possible to input information using the button of the remote control module 140 carried by the user by separating from the golf analysis device 100 (S390).

Accordingly, the golf analysis device 100 receives a request for providing distance information from the remote control module 140 to the hole cup through the communication unit 190. Thereby, the analysis unit 170 of the golf analysis device 100 may compute the distance from the golf analysis device 100 to the hole cup based on GPS location information confirmed by the GPS module equipped in the golf analysis device 100, and output the computed distance information through the speaker module 150, thereby providing information on the remaining distance to the hole cup to the user who is playing a round (S395).

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

DESCRIPTION OF REFERENCE NUMERALS

10: Outer frame of golf cart
100: Golf analysis device
110: Sensor unit
130: Display unit
140: Remote control module
150: Speaker module
160: Fixation part
180: Camera unit
200: User terminal

What is claimed is:

1. A method of a golf analysis device including an internal memory, a camera unit, a sensor unit, a communication unit and a remote control module detachably coupled to the golf analysis device, the method comprising:
  generating, using the sensor unit, tracking data of a golf club moving by a user's swing motion and a golf ball hit by the user's swing motion;
  generating a swing analysis value of a user by analyzing the tracking data;
  transmitting, using the communication unit, the swing analysis value to a user terminal and to receive calibration information on the swing analysis value from the user terminal when the swing analysis value is determined by the user to be off by the calibration information, wherein the calibration information is input by the user by modifying a trajectory of the golf ball hit by the user's swing motion which is subjected to an image processing and displayed on a touch screen of the user terminal; and
  transmitting, using the remote control module, a request for providing a distance information on a remaining distance to a hole cup through the communication unit in response to an input by the user,
  wherein a calibrated swing analysis value is generated based on the tracking data generated by the sensor unit and the calibration information,
  wherein a distance between the golf analysis device and the hole cup is calculated based on a location information of the golf analysis device and a location information of the hole cup in response to a receipt of the request for providing the distance from the remote control module through the communication unit,
  wherein a user identification (ID) of the user is received from the user terminal via the communication unit in response to a selection of the user ID from the user terminal,
  wherein the tracking data of the golf club moving by the user's swing motion and the golf ball hit by the user's swing motion, the calibration information of the swing analysis value, and the calibrated swing analysis value are stored in the internal memory,
  wherein the tracking data of the golf club moving by the user's swing motion from the internal memory is searched for when the user performs a swing motion without hitting a golf ball and when a newly acquired tracking data of the swing motion without hitting the golf ball has a similar data pattern as the tracking data of the golf club moving by the user's swing motion, and the calibrated swing analysis value is outputted based on the tracking data and the calibration information stored in the internal memory, and wherein the user's swing motion is divided into an empty swing motion and a ball hitting swing motion, the ball hitting swing motion is detected when a noise level around a tee box where the user's swing motion is performed is rapidly lowered below a threshold level, and the camera unit is activated to photograph the user's swing motion when the ball hitting swing motion is detected.

2. The method of the golf analysis device according to claim 1, wherein the golf analysis device further comprises fixation parts configured to fix the golf analysis device to a golf cart.

3. The method of the golf analysis device according to claim 1, wherein the golf analysis device further comprises a speaker module configured to output the swing analysis value by voice.

4. The method of the golf analysis device according to claim 3, wherein the speaker module is configured to further output the distance information on the remaining distance to the hole cup.

5. The method of the golf analysis device according to claim 1, wherein the sensor unit detects the user who climbs up on the tee box.

6. The method of the golf analysis device according to claim 1, wherein the remote control module is detachably installed in a circular groove formed in a bottom surface of the golf analysis device.

\* \* \* \* \*